United States Patent
Zhu et al.

(10) Patent No.: US 10,424,205 B2
(45) Date of Patent: Sep. 24, 2019

(54) AUXILIARY BERTHING METHOD AND SYSTEM FOR VESSEL

(71) Applicant: NANJING UNIVERSITY 5D TECHNOLOGY CO., LTD., Nanjing, Jiangsu (CN)

(72) Inventors: Xi Zhu, Jiangsu (CN); Yuanyuan Li, Jiangsu (CN); Feng Yan, Jiangsu (CN); Xiang Li, Jiangsu (CN); Xun Cao, Jiangsu (CN); Weisong Pan, Jiangsu (CN); Jianwen Ding, Jiangsu (CN); Jibin Wang, Jiangsu (CN); Jun Wang, Jiangsu (CN); Chen Chen, Jiangsu (CN); Dapeng Li, Jiangsu (CN); Wei Li, Jiangsu (CN); Wenzhu Wang, Jiangsu (CN)

(73) Assignee: NANJING UNIVERSITY 5D TECHNOLOGY CO., LTD., Nanjing, Jiangsu (CN)

( * ) Notice: Subject to any disclaimer, the term of this patent is extended or adjusted under 35 U.S.C. 154(b) by 174 days.

(21) Appl. No.: 15/543,916

(22) PCT Filed: Sep. 21, 2015

(86) PCT No.: PCT/CN2015/090136
§ 371 (c)(1),
(2) Date: Jul. 14, 2017

(87) PCT Pub. No.: WO2016/112708
PCT Pub. Date: Jul. 21, 2016

(65) Prior Publication Data
US 2018/0012498 A1    Jan. 11, 2018

(30) Foreign Application Priority Data
Jan. 15, 2015 (CN) .......................... 2015 1 0020599

(51) Int. Cl.
| | | |
|---|---|---|
| *G08G 3/00* | (2006.01) | |
| *G06T 7/50* | (2017.01) | |
| *G06T 7/73* | (2017.01) | |
| *G08G 3/02* | (2006.01) | |
| *G01S 19/13* | (2010.01) | |
| *G01S 19/53* | (2010.01) | |

(52) U.S. Cl.
CPC ................. *G08G 3/00* (2013.01); *G06T 7/50* (2017.01); *G06T 7/73* (2017.01); *G08G 3/02* (2013.01);
(Continued)

(58) Field of Classification Search
CPC .... G01C 21/165; G01C 21/26; A01B 69/007; B61L 15/0072; B61L 27/0027;
(Continued)

(56) References Cited

U.S. PATENT DOCUMENTS 6,424,914 B1 *  7/2002  Lin ...................... G01C 21/165
                                                      342/357.29
6,631,323 B2 * 10/2003  Tucker ................. G01C 21/165
                                                      701/472
(Continued)

FOREIGN PATENT DOCUMENTS

| CN | 1373371 A | 10/2002 |
| CN | 201170800 Y | 12/2008 |

(Continued)

*Primary Examiner* — Redhwan K Mawari
(74) *Attorney, Agent, or Firm* — Novick, Kim & Lee, PLLC; Allen Xue

(57) ABSTRACT

The present invention provides an auxiliary berthing method and system for a vessel. Position information of a vessel relative to a berth is determined by a solar blind ultraviolet imaging method; meanwhile, by a GPS method, an attitude angle of the vessel relative to the berth is determined by at least two GPS receivers. Thus, the vessel can be berthed safely when getting close to the shore at low visibility. Further, in the method and device of the present invention, it can be preferable to integrate coordinate data and angle (Continued)

data received by a solar blind ultraviolet imaging module and GPS signal receiving modules by a normalized correlation algorithm and a data fusion algorithm, so as to improve the positioning accuracy.

12 Claims, 6 Drawing Sheets

(52) U.S. Cl.
CPC ........... *B63B 2213/02* (2013.01); *G01S 19/13* (2013.01); *G01S 19/53* (2013.01); *G06T 2207/20024* (2013.01); *G06T 2207/30252* (2013.01)

(58) Field of Classification Search
CPC ............... B61L 3/006; B63B 2022/006; B63G 2008/004; C23C 16/45595
See application file for complete search history.

(56) References Cited

U.S. PATENT DOCUMENTS

| | | | |
|---|---|---|---|
| 6,632,323 B2* | 10/2003 | Kim | C23C 16/45595 118/723 DC |
| 2008/0065286 A1* | 3/2008 | Han | A01B 69/007 701/28 |
| 2011/0118914 A1* | 5/2011 | Brooks | B61L 3/006 701/20 |
| 2011/0137470 A1* | 6/2011 | Surnilla | G01C 21/26 700/282 |
| 2012/0056781 A1* | 3/2012 | Kong | G01S 19/252 342/357.42 |
| 2015/0062717 A1* | 3/2015 | Okawa | G02B 7/102 359/676 |
| 2015/0083192 A1* | 3/2015 | Nobori | H01L 31/052 136/246 |
| 2016/0018339 A1* | 1/2016 | Perkins | G01N 33/1833 73/61.48 |

FOREIGN PATENT DOCUMENTS

| | | | |
|---|---|---|---|
| CN | 102192736 A | | 9/2011 |
| CN | 103177606 A | | 6/2013 |
| CN | 203070552 U | | 7/2013 |
| CN | 103398710 A | | 11/2013 |
| CN | 105004972 A | * | 10/2015 |
| JP | 10115522 A | * | 5/1998 |
| JP | 2006-078891 A | * | 3/2006 |
| JP | 2010152875 A | | 7/2010 |

\* cited by examiner (a)  (b)

AUXILIARY BERTHING METHOD AND SYSTEM FOR VESSEL

TECHNICAL FIELD OF THE INVENTION

The present invention relates to a safe navigation method and system for a vessel. More particularly, the present invention relates to a method and device for accurately monitoring a distance from a vessel and a shoreline and an attitude of the vessel during the berthing of the vessel.

BACKGROUND OF THE INVENTION

Safe vessel berthing is always an emphatically studied object in the water transportation field. In the process of berthing a vessel at a port or a wharf, the berthing speed and distance needs to be controlled strictly, and the attitude of the vessel also needs to be considered. A pilot must know very well geographic features, waterways, depth of water, water flow, settings of navigation marks, and local rules and regulations within a water area, and must have proficient skills for handling high berthing difficulties. Therefore, the pilot has very high working intensity, and also faces various safety risks.

In the water transportation field, severe weather, particularly foggy weather, seriously affects the smoothness of waterways. Statistical maritime data indicated that most of maritime accidents occur at night or in restricted visibility, and the maritime accidents in restricted visibility were in the majority; and fog is one of the most important factors causing the restricted visibility. When a vessel navigates in fog, due to various uncertain factors (e.g., the dynamic state of the vessel, the subjective intention of a navigator or the like), the navigator often makes a wrong decision, resulting in a maritime accident. At present, devices for aiding navigation mainly include a radar navigation system and an automatic identification system.

As for vessel piloting, the foggy weather will seriously influence the visual observation effect of a pilot, and consequently, the pilot is unable to judge the attitude of a vessel relative to a berth and thus unable to conduct the safe berthing of the vessel. Even if hydrological conditions at different ports and waterways are different, vessels will generally slow down at a visibility less than 1 sea mile, and large vessels will generally stop at a visibility less than 1000 m. Due to low visibility in the foggy weather, serious accidents often occur, for example, large vessels crash into piers. Meanwhile, vessel's passing a dam is influenced by the foggy weather, and the vessel must stopping passing the dam in the foggy weather. Therefore, the foggy weather not only influences the safety of vessel navigation, and also seriously influences the smoothness of waterways and port logistics.

At present, during the navigation and berthing of a vessel, some radio piloting systems, for example, radar, will be used for reference. However, a radar system is easily affected by external factors, such as weather, topography and external disturbance. Moreover, since the radar is generally erected at a high position on a vessel, it is difficult to detect conditions at a close distance from the vessel although it can detect conditions at a large distance from the vessel. Therefore, the radar system has great limitations during the piloting and berthing of a vessel. At present, a vessel berthing scheme is generally determined based on the visual estimation and judgment of a pilot. To avoid the occurrence of potential accidents, it is stipulated that no vessel's navigation and transportation is allowed in the severe weather.

Considering the actual demands of huge freight volume and turnover volume of passenger traffic nowadays, some navigation aids used in the severe weather have been developed, for example, a radar navigation system, an Automatic Identification System (AIS) and the like in the navigation field. Although these navigation aids may assist a navigator in navigating in the severe weather conditions, they still have many disadvantages due to many aspects such as technology, cost, precision and site.

Both the radar navigation system and the AIS in the prior art are navigation aid systems based on radio communication. As the common means for vessel navigation assistance, a radar navigation system for vessels has inevitable defects although it works well in positioning, navigation and collision prevention. For example, in the severe weather conditions (e.g., rainy, snowy or stormy weather), the radar navigation system is easily interfered by sea waves, rain and snow to generate clutters; and radars at a same frequency or an approximate frequency will also generate co-frequency radar interference clutters at a close distance. Moreover, the radar generally has a fixed blind zone of 30 m to 50 m, so that a sectored shadow zone will be generated due to the influence from objects such as a mast on the vessel. Additionally, due to the influence from complicated conditions, the radar will generate various false echoes, for example, multi-trace false echo, second-trace false echo, indirect-reflection false echo, side-lobe echo and the like. In the actual use, all the interference clutters and the false echoes will often make a manipulator difficult to distinguish or observe, and thus result in wrong guidance for navigation.

The Automatic Identification System (AIS) for vessels is a device based on satellite positioning, with a precision of 5 m to 30 m. Due to the absence of any blind zone, its positioning precision is higher than that of the radar and does not change with the change in distance and orientation of a target. The AIS consists of shore-based (base station) facilities and ship-borne devices, and is a novel digital navigation aiding system and device integrating the network technology, the modern communications technology, the computer technology and the electronic information display technology. The AIS is essentially a broadcast transponder system which operates on a maritime mobile communication channel VHF and can automatically transmit information about a vessel (e.g., the name of the vessel, call sign, maritime mobile service identity, location, course, speed and the like) to other vessels or the shore, process multiplex communication at a rapid update rate, and use a self-control time division multiple access technology to fulfill the high density of communication, so that the reliability and real-time performance of ship-to-ship and ship-to-shore operations are ensured. However, the AIS still has many limitations. Firstly, like the radar navigation system, the provided information is not a real visual image and thus does not really help the berthing and navigation in the foggy weather. Since a pilot fails to see the ambient environment, the vessel also needs to be stopped. Secondly, the equipment precision of 5 m to 30 m perhaps meets the requirements for collision prevention; however, for close-distance berthing, a precision error of 5 m easily results in a serious collision of a large vessel with a wharf or a lighter at the critical moment of berthing.

In conclusion, the two navigation aids in the prior art, i.e., the marine radar navigation system and the ship-borne AIS, still cannot make a vessel berthed safely during close-distance navigation in the low-visibility conditions.

Recently, solar blind ultraviolet navigation and berthing systems have been developed in the prior art. On the basis of the solar blind ultraviolet phenomenon within a waveband of 200 nm to 280 nm, a group of solar blind ultraviolet light source lamps are provided on the shore, and a solar blind ultraviolet detector is provided on a vessel to be navigated and berthed. The position of the vessel relative to a wharf is eventually obtained according to the solar blind ultraviolet signals received by the detector, so that it is advantageous for safe berthing. For example, Chinese Patent Application No. 2012105507102, entitled NAVIGATION AND BERTHING SYSTEM BASED ON SOLAR ULTRAVIOLET SIGNALS, has disclosed a solar blind ultraviolet auxiliary berthing system. The system consists of a solar blind ultraviolet light source system, a three-axis electronic compass, an optical imaging module and an information processing terminal. The three-axis electronic compass is connected to the optical imaging module to acquire angular information of the optical imaging module during rotation. The optical imaging module includes a spectroscope, a visible or infrared imaging channel and a solar blind ultraviolet imaging channel, wherein the visible or infrared imaging channel receives visible light signals and outputs visible or infrared video signals, and the solar blind ultraviolet imaging channel receives solar blind ultraviolet signals and outputs solar blind ultraviolet video signals. The information processing terminal is used for calculating navigation attitude data of the vessel according to digital signals of the two videos and then outputting a composite video to a display system. In this patent application, by connecting the three-axis electronic compass to the optical imaging module, the angular information of the optical imaging module during rotation is acquired, and angular information of the vessel relative to the shoreline is eventually obtained. However, this system still has some disadvantages. For example, when in use, the three-axis electronic compass will be interfered by a large magnetic field sometimes, so that the obtained data has an error. As a result, it is very difficult to obtain the accurate distance from the vessel to the shoreline of a berth, and it is thus difficult to realize safe berthing.

Therefore, in the prior art, the accurate positioning, berthing and piloting of a vessel in the foggy weather cannot be ensured conveniently, accurately and safely at present.

SUMMARY OF THE INVENTION

To solve the above problems, an objective of the present invention is to provide a berthing method for a vessel, which jointly uses a solar blind ultraviolet detection technology and a GPS positioning technology to obtain data on the attitude and relative distance of a vessel relative to a shoreline and a berth for purpose of safe berthing of the vessel. Another objective of the present invention is to provide a system for guiding a vessel to berth.

The present invention employs the following technical solutions.

An auxiliary berthing method for a vessel is provided, including providing a solar blind ultraviolet imaging module and a data processing module on a vessel, the solar blind ultraviolet imaging module measuring, according to received solar blind ultraviolet signals transmitted by a solar blind ultraviolet light source array arranged in advance on the shore, information about a position relationship between the vessel and a related berth, characterized in that the method further includes the steps of:

1) providing at least two GPS signal receiving modules, at least one of which is arranged on the vessel, used for receiving a position signal of the vessel from a related satellite; and 2) designing the data processing module to comprise a signal receiving element which can be matched with the solar blind ultraviolet imaging module and the GPS signal receiving module in a wired and/or wireless manner, receiving data related to the position of the vessel from the solar blind ultraviolet imaging module and the GPS signal receiving module, calculating coordinate values of a reference point of the vessel, and determining an attitude angle of the vessel relative to a shoreline of the berth according to the position data from the solar blind ultraviolet imaging module and the GPS signal receiving module mounted on the vessel.

Wherein, the attitude of the vessel relative to the shoreline of the berth may be represented by only position coordinates of several reference points on the vessel. The attitude of the vessel relative to the shoreline of the berth may also be represented by coordinates of a reference point and at least one attitude angle of the vessel. The attitude angle is at least one of many angles representing the attitude of the vessel, for example, a course angle, an angle of pitch, a roll angle or the like. The GPS method and system in the present invention, technically including a Global Navigation Satellite System (GNSS) and similar systems, refers to a technology for positioning a target on the ground by using a geosynchronous satellite rotating about the earth. Such a technology includes, for example, American GPS, Chinese Beidou system, European Galileo system, Russian GLONASS system or the like.

In the method of the present invention, a way of arranging the GPS signal receiving modules may be as follows: at least one GPS signal receiving module is arranged on the shore, and at least one GPS signal receiving module is mounted on the vessel; the GPS signal receiving module on each vessel and the GPS signal receiving module on the shore work cooperatively to form a GPS differential system, wherein the GPS signal receiving module on the shore is used as a master GSP station, the GPS signal receiving module on the vessel is used as a slave GPS station, and the accuracy of measurement of data on the position and attitude angle of the vessel by the slave GPS station is improved by the master GPS station; upon receiving position data from the related satellite, the master GPS station can directly transmit the position data to the data processing module to obtain the position data of the vessel; or, the master GPS station can transmit, to at least one slave GPS station, the position data and other data helpful in improving the accuracy of measurement of the position data by the slave GPS station, and the slave GPS station integrates the received GPS position data, then processes the data and transmits the data to the data processing module so as to obtain the position data of the vessel.

Wherein, the way of communication between the master GPS station on the shore (shore-based master GPS station) and the slave GPS station on the vessel may be as follows: for example, the master GPS station on the shore directly transmits signals to the slave GPS station on the vessel (vessel-based slave GPS station) by broadcasting or by directionally transmitting. Alternatively, the shore-based master GPS station transmits the position data to a transmission point (e.g., a transmission point arranged at or nearby the berth) in a wireless or wired manner, and then wirelessly transmits the position data from the transmission point to the vessel-based slave GPS station at a frequency identical to or different from the previous frequency.

The way of arranging the GPS signal receiving modules may also be as follows: all (at least two) GPS signal receiving modules are arranged on the vessel to be berthed.

The data processing module is electrically connected to the solar blind ultraviolet imaging module and the GPS signal receiving modules, respectively, and used for processing data from each module, calculating coordinate values of the vessel according to the data received by the solar blind ultraviolet imaging module, and determining an attitude angle of the vessel relative to the shoreline or the berth according to the position information received from a related satellite by the GPS signal receiving modules.

In the method, further, the data processing module integrates the coordinate data or attitude data received by the two solar blind ultraviolet imaging modules by a normalized correlation algorithm. Specifically, when the coordinate data is integrated, three-axis coordinates of the position of the solar blind ultraviolet imaging module are represented by x, y and z, respectively; a vector $p_i(x_i,y_i,z_i)$ is used to represent the $i^{th}$ group of positioning data among N groups of positioning data, which are subjected to angular and spatial transformation, returned by N systems, where i=1, 2, 3 ... N. Here, N is the number of the original position data sources. For example, when the coordinate values obtained by the solar blind ultraviolet imaging module and three GPS signal receiving modules are integrated, N=4; and, when the coordinate values obtained by the three GPS signal receiving modules are integrated, N=3. The positioning data, which is subjected to angular and spatial transformation, is obtained by the following method: when the relative positions of all the solar blind ultraviolet receiving module and the GPS signal receiving modules and the attitude angle of the vessel are known, the measured position data of different measurement modules are converted into the measured position data of a same measurement module based on a spatial position relationship and through spatially geometric transformation. The specific transformation method is as follows:

(1) a reference point is determined, wherein the reference point may be the position of any one of the solar blind ultraviolet receiving module and the GPS signal receiving modules, or may be another point;

(2) the distance from each other measurement module to the reference point and a direction angle (which is a parameter for a light source reference system and needs to be determined by superposing the attitude angle of the vessel) are measured, so that a corresponding transformation vector is obtained; and (3) the transformation vector is added to the relative position coordinate parameters obtained by each measurement module to obtain the transformed positioning data.

A Normalized Correlation Coefficient (NCC) is used to represent the confidence of the positioning data returned by each system, which is expressed as follows:

$$NCC(p_i) = \sum_{\substack{j=1 \\ i \neq j}}^{N} \frac{p_i \cdot p_j}{|p_i||p_j|} = \sum_{\substack{j=1 \\ i \neq j}}^{N} \frac{x_i x_j + y_i y_j + z_i z_j}{\sqrt{x_i^2 + y_i^2 + z_i^2}\sqrt{x_j^2 + x_j^2 + z_j^2}} \quad (1)$$

$$j = 1, 2, 3, \ldots, N.$$

A threshold G for the average confidence value of the detection system consisting of all the solar blind ultraviolet imaging module and the GPS signal receiving modules is set, and the positioning data with a lower NCC is filtered according to the threshold G to obtain a final system confidence weight w, which is expressed as follows:

$$w(p_i) = \begin{cases} NCC(p_i), & NCC(p_i) > G \\ 0, & NCC(p_i) \leq G \end{cases} \quad (2)$$

Then, the final fitted positioning data on the position of the vessel is obtained:

$$p_{result} = \frac{\sum_{i=1}^{N} w(p_i) \times p_i}{\sum_{i=1}^{N} w(p_i)} \quad (3)$$

The fitted attitude angle data of the vessel is calculated according to the fitted coordinate values of the N-1 GPS signal receiving modules.

The integration of the position data of the vessel may be integration of the position data obtained by the GPS signal receiving modules only, or joint integration of the position data obtained by the solar blind ultraviolet module and the position data obtained by the GPS signal receiving modules to obtain the fitted position data of the vessel.

The obtained coordinate data or attitude angle data may also be integrated by a data fusion algorithm.

Other methods may also be used. For example, generally, the position data obtained by the solar blind ultraviolet module is more accurate, not lower than centimeter-level at present. However, the position data obtained by the GPS signal receiving modules is lower in accuracy, at most decimeter-level at present. Therefore, the normalization of the coordinate data having relatively consistent accuracy, received from the related satellite by the GPS signal receiving modules, has better effect.

In accordance with the method and device of the present invention (the overall description and definition of the device may refer to the following contents in the specification, for example), during the arrangement of the GPS signal receiving modules on the vessel, these GPS signal receiving modules may be arranged with a large distance from each other in order to reduce the system error of the measured coordinate and angle data.

In accordance with the method and device of the present invention, during the arrangement of the GPS signal receiving modules on the vessel, these GPS signal receiving modules may be arranged with a large distance from the solar blind ultraviolet module in order to reduce the system error of the measured coordinate and angle data.

In accordance with the vessel berthing method of the present invention, the solar blind ultraviolet receiving module may be calibrated before measurement, to determine measurement-related photoelectric parameters of the solar blind ultraviolet camera. The system photoelectric parameters involved in the calibration include: focal lengths $f_x$ and $f_y$ in pixels in the x and y directions, reference points $c_x$ and $c_y$ in an image plane, and radial distortion coefficients $k_x$ and $k_y$ in the x and y directions.

Further, in accordance with the vessel berthing method of the present invention, a power control system of the vessel is connected to a navigation system, and configured to periodically receive a berthing distance signal from the solar blind ultraviolet module and continually and automatically adjust the attitude of the vessel for berthing.

According to another aspect of the present invention, the present invention further discloses a vessel berthing system. The vessel berthing system includes: a solar blind ultraviolet imaging module, which is arranged on a vessel and configured to measure, according to received optical signals transmitted by a solar blind ultraviolet light source array arranged in advance on the shore, information about a position relationship between the vessel and a related berth; and, a data processing module, which is electrically connected to the solar blind ultraviolet imaging module and configured to process the received data of the solar blind ultraviolet imaging module to obtain coordinates of the vessel; the system further includes at least two GPS signal receiving modules, at least one GPS signal receiving module is mounted on the vessel, and each GPS signal receiving module includes a satellite signal receiving portion used for receiving a positioning signal from a related satellite and a signal transmission portion for transmitting the received satellite signal to the data processing module; and, the data processing module is electrically connected to the GPS signal receiving modules, and processes the positioning data received from the related satellite by the GPS signal receiving modules and thereby determines an attitude angle of the vessel.

Further, as a preferred implementation, in the vessel berthing system of the present invention, all the GPS signal receiving modules may be mounted on the vessel.

As another preferred implementation of the vessel berthing system of the present invention, at least one GPS signal receiving module included, which is mounted on the vessel as a vessel-based GPS signal receiving module. Each vessel-based GPS signal receiving module and one GPS signal receiving module arranged on the shore work cooperatively to form a GPS differential system. Wherein, the GPS signal receiving module on the shore is used as a master GPS station, and the GPS signal receiving module on the vessel is used as a slave GPS station; and, the slave GPS station receives, from a related satellite, its own position data, receives, from the master GPS station, the position data of the master GPS station and other data helpful in improving the accuracy of measurement of the position data by the slave GPS station, and processes the data or transmits the data to the data processing module for processing to obtain data representing the position and attitude angle of the vessel.

In the GPS differential system scheme, if only one vessel-based GPS signal receiving module is mounted on the vessel, more accurate values presenting the position of the vessel may be obtained by respectively the solar blind ultraviolet imaging module and the vessel-based GPS signal receiving module, and the two position values may determine the position and attitude angle of the vessel relative to the berth.

In the GPS differential system scheme, if two or more vessel-based GPS signal receiving modules are mounted on the vessel, one way is to obtain, from the position value of the vessel obtained by the solar blind ultraviolet imaging module, the attitude angle of the vessel relative to the vessel through the plurality of vessel-based GPS signal receiving modules. As another way, if the GPS differential system is high enough in accuracy, the positioning information of any one of the vessel-based GPS signal receiving modules may also be used as the position information of the vessel, and the attitude angle of the vessel is calculated from the position information of the solar blind ultraviolet imaging module or other vessel-based GPS signal receiving modules; or, the attitude angle of the vessel is derived from the position information of the vessel-based GPS signal receiving module for the purpose of positioning and the position information of one of the solar blind ultraviolet imaging module or other vessel-based GPS signal receiving modules.

Preferably, in the method and system of the present invention, the data obtained by the solar blind ultraviolet imaging module and/or the plurality of GPS signal receiving modules may be processed by a normalized correlation algorithm. In the normalized correlation processing method, a threshold for an average confidence value of all systems and the confidence of each module (the solar blind ultraviolet imaging module and the vessel-based GPS signal receiving modules) may be obtained by global error analysis, positioning data with a lower confidence is filtered by using the threshold to obtain a final confidence weight for each module, and weighted averaging is performed on each module by using the confidence weight so as to obtain the final data. The normalized correlation algorithm may be solidified into the system in a form of hardware (e.g., IC, ASIC or FPGA) and/or software during the preparation of the system of the present invention, and then become a part of the system of the present invention.

According to another improved aspect of the vessel berthing system of the present invention, in the design of software and hardware, the data processing module uses a data fusion algorithm to integrate the obtained coordinate data or attitude angle data. For example, the data fusion algorithm may be as follows: the confidence of data returned by each subsystem is judged by using a root-mean-square-error rmse actually calculated based on the measured data of each subsystem. Specifically:

(I) when the data to be integrated is positioning data, a vector $p_i(x_i,y_i,z_i)$ is used to represent N groups of positioning data, which are subjected to angular and spatial transformation, returned by N groups of detection subsystems, where i=1, 2, 3 . . . N; the positioning data, which is subjected to angular and spatial transformation, is obtained by the following method: when the relative positions of all the solar blind ultraviolet imaging module and the GPS signal receiving modules and the attitude angle of the vessel are known, the measured position data of different measurement modules are converted into the measured position data of a same measurement module based on a spatial position relationship and through spatially geometric transformation;

a) the confidence of the data returned by each subsystem is judged by using a root-mean-square-error rmse actually calculated by the measured data of each subsystem, where the formula for calculating the root-mean-square-error of the measured data of each subsystem is as follows:

$$rmse = \sqrt{\sum_{i=1}^{n}(x_i - x_f)^2/(n+1)} \qquad (4)$$

where rmse represents the root-mean-square-error, $x_i$ represents the measured data of each measurement subsystem on the X-axis coordinate at a moment i, $x_f$ represents the filtered value of the data $x_i$ at the moment i, n represents the total number of the measured data, i.e., the number of the subsystems, and the filtered value at the moment i is obtained by Kalman filtering;

b) determination of a weight: according to a robust statistics theory, information in the data may be classified into three categories: valid information, available information and harmful information; for the three kinds of data, the assignment of different weights thereto may make the three kinds of data play different roles; therefore, a method for weight assignment is as follows: on a segment basis, the valid information may be completely received during fusion, the available information is selected according to a certain curve change, and the harmful information or invalid information is completely rejected; the weight assignment is performed by curve fitting:

$$\omega = \begin{cases} 0, |e| \geq b \\ f(|e|), b \geq |e| \geq a \\ 1, |e| \leq a \end{cases} \quad (5)$$

where $\omega$ is the weight, the parameter b is the minimum limit for judging outliers, and the parameter a is a boundary value between a valid numerical value and an available numerical value; if the error is greater than b, the error is considered as an outlier and the corresponding weight is 0; if the error is less than a, the error is considered as a valid value and the corresponding weight is 1; the weight of an intermediate available value is given according to a curve y=f(x), and f(x) must fulfill the condition that, within an interval (a,b), f(x) decreases rapidly with the increase of the error; the f(x) is expressed as follows:

$$f(x) = \frac{1}{\sqrt{2\pi}\,\sigma} \exp\left(-\frac{(x-\mu)^2}{2\sigma^2}\right) \quad (6)$$

where $\mu$ and $\sigma$ are a mean and a square for the normal distribution, respectively, since a normal curve exhibits the characteristics of a decreasing function within a region of x>$\mu$, then $\mu$=0; actually, a half-normal curve is applied; and the f(x) is further expressed as follows:

$$f(x) = \frac{1}{\sqrt{2\pi}\,\sigma} \exp\left(-\frac{x^2}{2\sigma^2}\right) \quad (7)$$

the value of $\sigma$ is given according to the 3$\sigma$ rule, and can be obtained by a normal curve fitting weight assignment method through the following formula:

$$a_{ki} = \frac{f(rmse_{ki})}{\sum_{i=1}^{n} f(rmse_{ki})} \quad (8)$$

furthermore, $$\sum_{i=1}^{N} a_{ki} = 1,$$

where $rmse_{ki}$ represents the root-mean-square-error of the $i^{th}$ system at a moment k, and $\alpha_{ki}$ represents the weight of the $i^{th}$ system at the moment k;

c) the final result of data fusion is as follows:

$$\hat{X}_{ki} = \sum_{i=1}^{N} a_{ki} X_{ki} \quad (9)$$

where $\hat{X}_{ki}$ is the fused value at the moment k, and $x_{ki}$ represents the measured data obtained by each subsystem at the moment k; and d) by the same method as in the steps a) to c), a final result of data fusion of the Y-axis coordinate value y and the Z-axis coordinate value z is calculated; and (II) when the data to be integrated is the attitude angle data, a vector $q_i(\alpha_i,\beta_i,\gamma_i)$ is used to represent N groups of attitude angle data returned by the N measurement subsystems, where i=1, 2, 3 . . . N; and, by the same method as in the step (I), the integrated attitude angle data is calculated.

Another data fusion method may also be used, including the following specific steps:

(I) when the data to be integrated is the positioning data, a vector $p_i(x_i,y_i,z_i)$ is used to represent N groups of positioning data, which are subjected to angular and spatial transformation, returned by N groups of detection subsystems, where i=1, 2, 3 . . . N; the positioning data, which is subjected to angular and spatial transformation, is obtained by the following method: when the relative positions of all the solar blind ultraviolet imaging module and the GPS signal receiving modules and the attitude angle of the vessel are known, the measured position data of different measurement modules are converted into the measured position data of a same measurement module based on a spatial position relationship and through a spatially geometric transformation;

a) a standard deviation of each coordinate sequence in the position data is calculated: the standard deviation of each coordinate sequence in the N groups of positioning data returned by the N groups of detection subsystems is calculated as the basis for judging outliers in each coordinate sequence in the N groups of data, where the standard deviation of each coordinate sequence is as follows:

$$\sigma_{index} = \sqrt{(X_{index} - \overline{X}_{index})^2 / N} \quad (10)$$

where, if index$\in$(x,y,z), $\sigma_{index}$ presents the standard deviation of each coordinate sequence in the N groups of data, $X_{index}$ represents the N groups of measured data, each of which contains a coordinate value (x,y,z), and $\overline{X}_{index}$ represents the average value of the N groups of data, i.e., a one-dimensional vector formed by the average value of each coordinate sequence;

b) outliers in each coordinate sequence are obtained according to the calculated standard deviation, wherein the outliers can be judged by the following formula:

$$\text{outliters} = |X_{index} - \overline{X}_{index}| > c^* \sigma_{index} \quad (11)$$

where outliers represent the obtained outliers; once a coordinate value in a group of coordinate data consisting of x,y,z is judged as an outlier in its sequence, this group of coordinate values is judged as an outliner in the N groups of coordinate data; C is a constant coefficient determined according to experimental experiences and requirements; and the constant can be determined by: judging a fluctuation range of test values through lots of tests, selecting a symmetric range by using a mean of the test values as a center with lots of unreasonable points going beyond this range, and using half of the length of this range as C;

c) the outliers are removed from the N groups of original measured data to obtain a new positioning data sequence X' having a dimensionality of N', and performing equally-weighted average data fusion on X' to obtain final fused data, as follows:

$$\hat{X}' = \frac{1}{N'} \sum_{i=1}^{n} X' \qquad (12)$$

where $\hat{X}'$ is the final positioning data after data fusion; and d) by the same method as in the steps a) to c), a final result of data fusion of the Y-axis coordinate value y and the Z-axis coordinate value z is calculated; and (II) when the data to be integrated is the attitude angle data, a vector $q_i(\alpha_i, \beta_i, \gamma_i)$ is used to represent N groups of attitude angle data returned by the N groups of detection subsystems, where i=1, 2, 3 ... N; and, by the same method as in the step (I), the integrated attitude angle data is calculated.

Wherein, the algorithm flow includes: (1) calculating a standard deviation of each coordinate sequence in the positioning data; (2) obtaining outliers in each coordinate sequence according to the calculated standard deviation; (3) removing the outliers from the original measured data; and, (4) calculating final positioning data by equally-weighted data fusion so as to obtain the quantity y.

The method and device of the present invention is merely exemplarily described above. Those skilled in the art may completely make various specific implementations according to the above contents without departing from the overall concept of the present invention. For example, in the above description of the present invention, the position data obtained by the solar blind ultraviolet receiving module is generally used as the main basis for the position of the vessel. Actually, during specific implementations, when the accuracy of the positioning data of the GPS system is comparable to the positioning accuracy of the solar blind ultraviolet receiving module, the position data obtained by the GPS system can be absolutely used as the main basis for the position and angle information expected to be obtained by the method and device of the present invention.

In the present invention, position information of a vessel relative to a berth is determined by a solar blind ultraviolet imaging method; meanwhile, by a GPS method, an attitude angle of the vessel relative to the berth is determined by at least two GPS receivers. Thus, the vessel can be berthed safely when getting close to the shore at low visibility. Further, in the method and device of the present invention, it can be preferable to integrate coordinate data and angle data received by a solar blind ultraviolet imaging module and GPS signal receiving modules by a normalized correlation algorithm and a data fusion algorithm, so as to improve the positioning accuracy. With the auxiliary berthing method and system for a vessel provided by the present invention, the problem in the prior art that the vessel has berthing difficulty in the foggy weather and the problem in the prior art that piloting and berthing devices for a vessel are greatly affected by weather, environment and the like can be remarkably solved. Even in the foggy weather, more visual, accurate and safe navigation information can be provided for a pilot, so that it is convenient for the pilot to pilot the vessel for berthing in the foggy weather, and the smoothness of waterways and port logistics in the foggy weather is thus ensured.

DETAILED DESCRIPTION OF THE INVENTION

According an example of the present invention, a system for improving a vessel's close-distance navigation capability in the foggy weather may be provided. This system is able to display a schematic diagram of a vessel and a shoreline and the position information, so that a pilot is able to berth the vessel at low visibility through an output interface of a display device.

For this purpose, the present invention will be further described below with reference to the accompanying drawings by embodiments. The following embodiments are merely illustrative, and the present invention is not limited to the solutions in the embodiments. Additionally, all technical solutions obtained by simple transformation by those skilled in the art within the scope of the prior art shall fall into the protection scope of the present invention.

Embodiment 1

Figure 1:
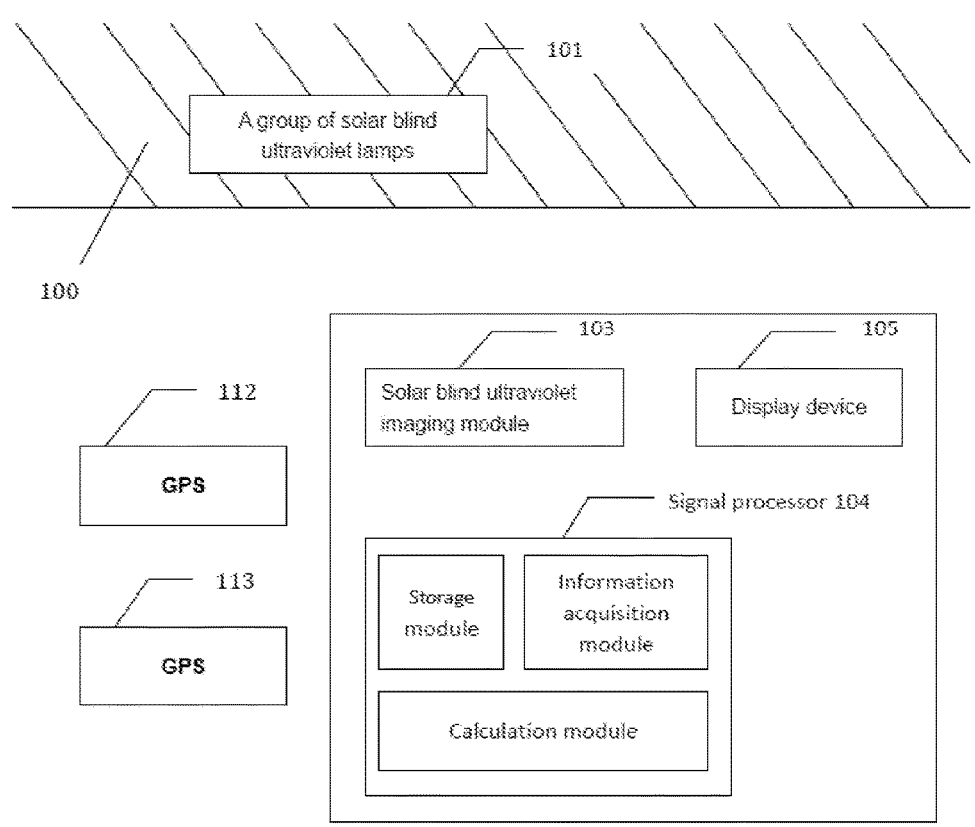
FIG. 1 is a block diagram of a system for berthing and navigating a vessel according to the present invention.

FIG. 1 shows a block diagram of a system for berthing and navigating a vessel. The present invention mainly solves the problem on close-distance berthing of the vessel in the foggy weather. In this embodiment, the vessel navigation system includes a group of solar blind ultraviolet lamps 101, two GPS modules 112 and 113, a solar blind ultraviolet imaging module 103, a data processing module 104 and a display device 105.

Figure 2:
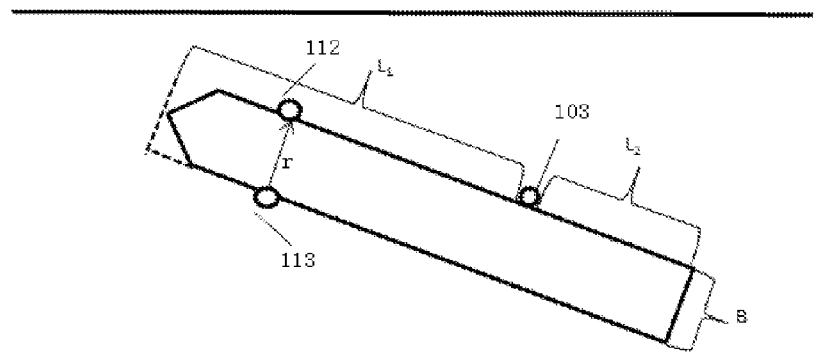
FIG. 2 is a diagram showing a mounting position of the equipment.

All the GPS modules 112 and 113 and the solar blind ultraviolet imaging module 103 are mounted on the vessel. The differential GPS modules 112 and 113 are preferably mounted at such a position that it is most convenient to determine the course. In this embodiment, the two differential GPSs are mounted on decks on two sides of a cab, and a connection line between the two differential GPS modules may be approximately perpendicular to a connection line between the head portion and tail portion of the vessel. In the two differential GPS modules, the master GPS module (also called a master station) 112 is mounted at a position close to the shoreline, and the slave GPS module (also called a slave station) 113 is mounted at a position away from the shoreline. The solar blind ultraviolet imaging module 103 is mounted on a deck on one side of the vessel. For convenience of subsequent calculation, in this embodiment, positions on the vessel having a marked distance away from the head portion and the tail portion are preferably selected. The distances from the solar blind ultraviolet module to the head portion and the tail portion are $L_1$ and $L_2$, respectively, which are known and have been marked on the vessel. The specific mounting positions are roughly shown in FIG. 2. The gray area 100 in FIG. 1 is the shoreline where the vessel is going to berth.

The solar blind ultraviolet imaging module 103, the signal processor 104 and the display device 105 may be integrated together. The data processing module 104 includes an information acquisition module, a calculation module and a storage module.

This embodiment includes the following main steps, among which steps 1 to 3 are preparation operations on the shore, and steps 4 to 5 are operations performed on the vessel.

Figure 3:
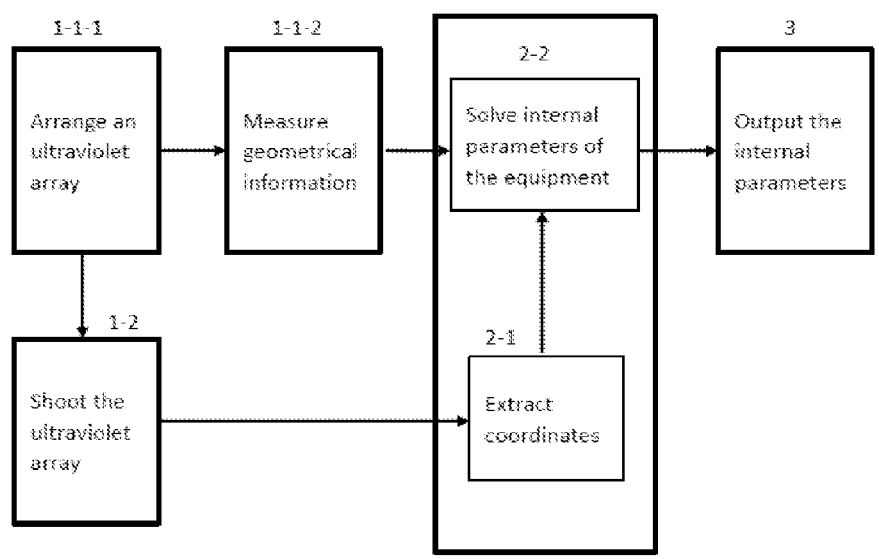
FIG. 3 is a flowchart of camera calibration.
Figure 4:
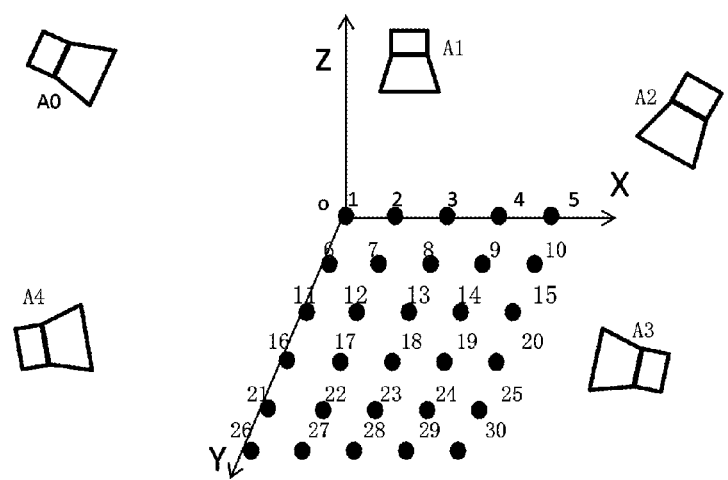
FIG. 4 is a diagram showing an ultraviolet array and a shooting position.

1. A camera is calibrated to obtain internal parameters. There are many methods for calibrating the camera and algorithms for obtaining the internal parameters. Here, a conventional calibration technology or Zhenyou Zhang's calibration algorithm is preferably selected. The calibration flow is shown in FIG. 3:

step 1-1-1: an ultraviolet array is arranged;

step 1-1-2: geometrical information of the ultraviolet array is measured;

step 1-2: the ultraviolet array is shot by an ultraviolet receiver, where the ultraviolet array and the shooting position are shown in FIG. 4;

step 2-1: coordinates are extracted; and step 2-2: the internal parameters of the equipment are solved to obtain image plane coordinates of a specified ultraviolet light source, and the internal parameters ($f_x$, $f_y$, $c_x$, $c_y$, $k_x$, $k_y$, etc.) of the camera are obtained by the calibration algorithm.

2. Berth information is measured: an included angle θ between each berth shoreline in a port for berthing and a certain direction (for example, the north direction in this example) is measured in advance.

A yaw angle of the berth shoreline is measured by the differential GPSs (including the master station and the slave station) or other tools for measuring the yaw angle. When the differential GPS devices are used, the master station and the slave station may be placed on the head and tail sides of the berth, with an approximately equal distance to the berth offline.

Figure 5:
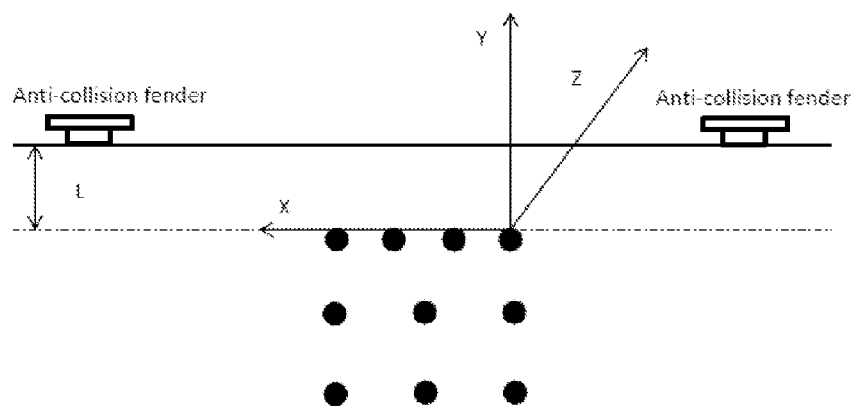
FIG. 5 is a diagram showing the position of a solar blind ultraviolet lamp array.

3. The ultraviolet light source lamp array is arranged and the related position information of the lamp array is measured: within a certain period of time (e.g., half an hour) before berthing the vessel, a target lamp array is arranged nearby the berth 100 by using the group of solar blind ultraviolet lamps 101. The target lamp array is in a shape of a square grid. The size of the target lamp array and the number of lamps are not limited. In this embodiment, the arrangement of FIG. 5 is used, where the size of the lamp array is 8 m×8 m, with an equal spacing between the lamps in each row and an equal row pitch.

In this embodiment, the distance from a reference point of the lamp array to a bollard of the berth is set as $L_2$ (which may be measured by measurement tools such as a flexible rule, where $L_2$ is the distance from the solar blind ultraviolet imaging image 103 to the tail portion of the vessel and is known; the setting of $L_2$ is to enable the solar blind ultraviolet detector to directly face the lamp array during the berthing of the vessel so as to determine the X direction of the vessel relative to the berth. Of course, other distance $L_n$ may also be used as long as the distance between $L_2$ and $L_n$ is known). During the arrangement of the lamp array, the vertical distance from the first row of the lamp array to an anti-collision fender is L (which may also be measured by simple length measurement tools such as a flexible rule), as shown in FIG. 5.

4. The course of the vessel and the attitude and position information of the berth shoreline are calculated. The following steps are included.

Firstly, a relationship between the course of the vessel and the direction of the berth shoreline (i.e., an included angle between the course of the vessel and the berth shoreline) is calculated. Specifically:

The slave GPS station 113 transmits latitude-longitude information about its own position to the master GPS station 112; and the master GPS station 112 obtains the distance between them from the latitude-longitude information of the slave GPS 113 station and its own latitude-longitude information, and also obtains an included angle α between a vector r from the slave GPS station 113 to the master GPS station 112 and the north direction and an included angle β between the r and the horizontal direction, where β is the roll angle of the vessel.

Since the vector r from the slave GPS station 113 to the master GPS station 112 is perpendicular to the course of the vessel, an included angle γ between the course of the vessel and the north direction can be obtained, where γ is the course angle of the vessel.

When the vessel is berthed to the right, γ=α−90°; and when the vessel is berthed to the left, γ=α+90°.

The included angle θ between each berth shoreline and the north direction is measured in advance, and the included angle between the course of the vessel and the berth shoreline may be obtained by the angle θ and the angle γ and then displayed on the display device 105 in form of an image, where a=γ−θ.

Secondly, position information of the vessel relative to the shoreline is determined.

When there is a close distance from the vessel to the shoreline, the solar blind ultraviolet imaging module can clearly identify all solar blind ultraviolet signals. Then, the signal processor 104 performs image processing and coordinate transformation on the image taken by the solar blind ultraviolet imaging module 103, to obtain position information X, Y and Z of the solar blind ultraviolet imaging module 103 in the coordinate system of the lamp array.

$$\begin{bmatrix} X \\ Y \\ Z \end{bmatrix} = R^{-1} \cdot (-T)$$

where R is a rotation matrix, and T is a translation vector.

Figure 6:
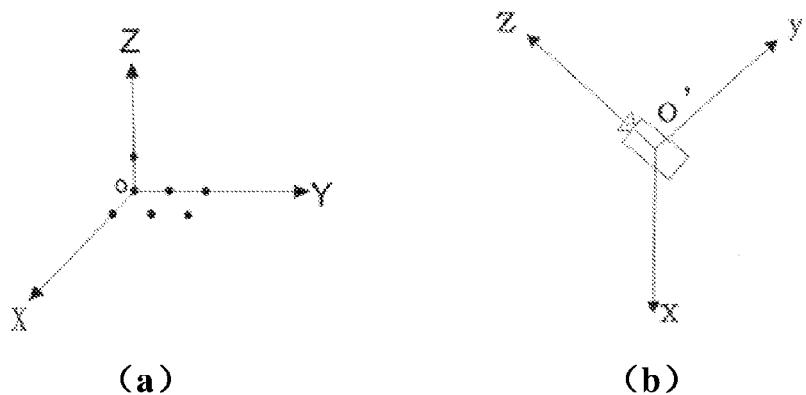
FIG. 6 shows a lattice coordinate system (a) and a camera coordinate system (b)

The algorithm includes the following specific steps:

since the internal parameters of the camera, the lattice coordinates and image plane coordinates of the target lattice coordinate system (referring to FIG. 6) are known by the camera calibration, coordinates and rotation direction of the camera in the target lattice coordinate system may be obtained:

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \cdot \left( R \cdot \begin{bmatrix} X \\ Y \\ Z \end{bmatrix} + T \right) \quad (1)$$

where ($f_x$, $f_y$, $c_x$, $c_y$) represents camera intrinsic matrix, R is a rotation matrix, T is a translation vector, (u,v) is image plane coordinates (in pixels), and (X,Y,Z) represents lattice coordinates in the target lattice coordinate system; and, the formula may be simplified as follows:

$$\begin{bmatrix} x \\ y \\ z \end{bmatrix} = R \cdot \begin{bmatrix} x \\ y \\ z \end{bmatrix} + T \qquad (2)$$

where (x,y,z) represents coordinates of a target lattice in the camera coordinate system (referring to FIG. 6), so that R and T may be interpreted as a transformation matrix for transforming the target lattice coordinate system into the camera coordinate system.

During the calculation of the coordinates of the camera in the target lattice coordinate system, since both the internal parameters ($f_x, f_y, c_x, c_y$) and the lattice coordinates (X,Y,Z) in the target lattice coordinate system are fixed values and the image plane coordinates (u,v) are acquired from an image in real time, the rotation matrix $R_0$ and the translation vector $T_0$ at the same moment ($u_0, v_0$) may be correspondingly obtained in real time. Then, if it is required to obtain the lattice coordinates of the camera in the target lattice coordinate system, the origin (0,0,0) of the camera coordinate system is substituted into the left side of the formula 2 to solve ($X_0, Y_0, Z_0$) on the right side, thus:

$$\begin{bmatrix} X_0 \\ Y_0 \\ Z_0 \end{bmatrix} = R_0^{-1} \cdot (-T_0) \qquad (3)$$

An inverse matrix $R_0^{-1}$ of the rotation matrix represents the rotation of the camera coordinate system relative to the target lattice coordinate system, and may be simplified into a rotation vector through transformation. This vector represents an Euler angle of rotation of the camera relative to the target lattice coordinate system.

Among the fixed values mentioned during the calculation of the camera coordinates, the target lattice coordinate is a result measured after manual arrangement, and the internal parameters represent intrinsic parameters of the camera, where $f_x$ and $f_y$ are values of focal lengths by using the number of pixels in the horizontal direction and the vertical direction as a unit of measurement, and $c_x$ and $c_y$ are coordinates of pixels formed by the right front of the center of a camera lens (i.e., a point on a theoretically optical axis) on an image plane.

If the distance from the solar blind ultraviolet imaging module 103 to the shoreline in a vertical direction, i.e., along the vessel's rail, is set as $Y_{rail}$, $Y_{rail}=Y-L-Z^*\tan\beta$, where L is the distance from the first row of the lamp array to the anti-collision fender and β is the roll angle of the vessel.

If the distance from the head portion of the vessel to the shoreline in the vertical direction is set as $Y_{head}$ and the distance from the tail portion of the vessel to the shoreline in the vertical direction is set as $Y_{tail}$, $Y_{head}=Y_{rail}-L_1*\sin(\gamma-\theta)$, and $Y_{tail}=Y_{rail}+L_2*\sin(\gamma-\theta)$, where $L_1$ and $L_2$ are the distances from the solar blind ultraviolet imaging module 103 to the head portion of the vessel and the tail portion of the vessel, respectively, and γ and θ are the included angle between the course of the vessel and the north direction and the included angle between the berth shoreline and the north direction, respectively.

Figure 7:
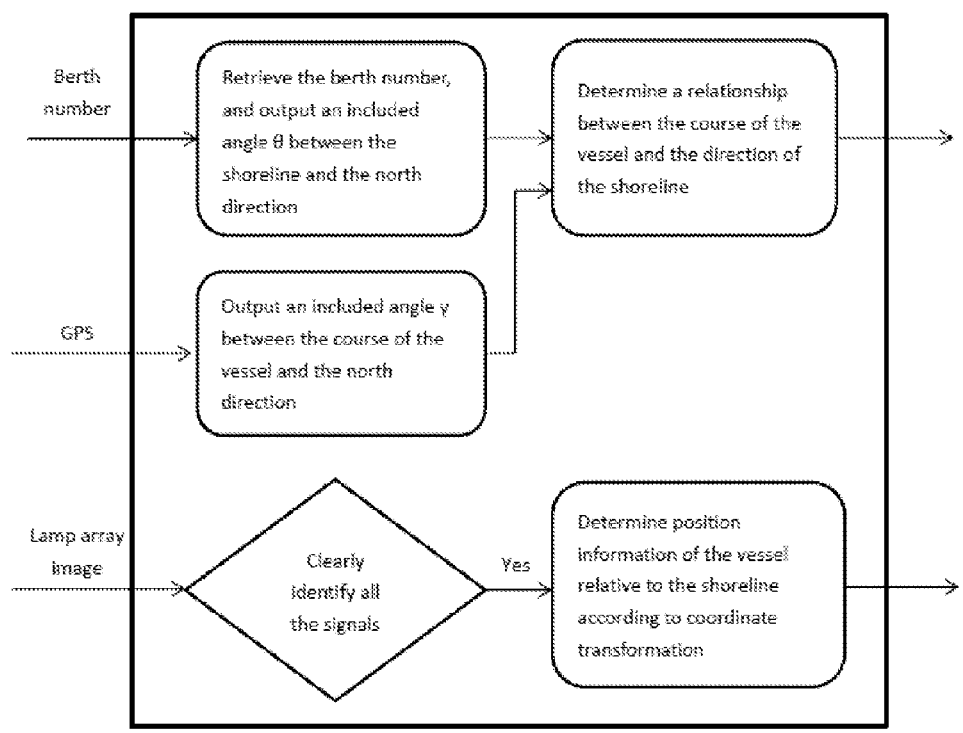
FIG. 7 is a flowchart of execution of berthing software.

5. Scene simulation is performed to output a schematic navigation diagram and the position coordinate information into the display device 105. FIG. 7 shows a flowchart of execution of the berthing software. Before the signal processor 104 operates, information about the berth, including the berth number and direction information of the vessel relative to the shoreline during berthing (i.e., berthing to the left or berthing to the right), is input; position information $L_1$ and $L_2$ of the solar blind ultraviolet imaging module on the vessel is input, where $L_1$ and $L_2$ are the distances from the solar blind ultraviolet imaging module to the head portion of the vessel and to the tail portion of the vessel, respectively; and, the width B of the vessel is input.

Figure 8:
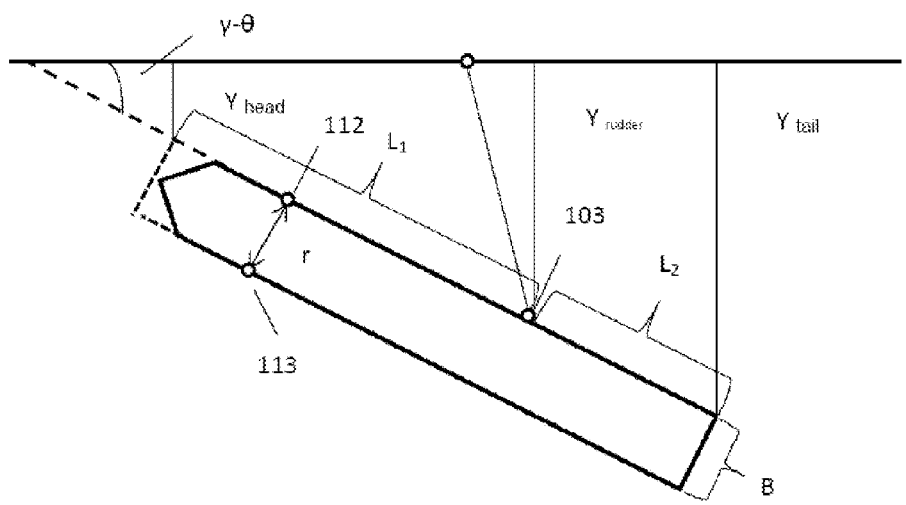
FIG. 8 is a schematic diagram of a vessel and a shoreline.

According to the position information X and Y of the vessel in the lamp array coordinate system, the direction information γ−θ of the vessel relative to the shoreline, the position information $L_1$ and $L_2$ of the solar blind ultraviolet imaging module relative to the vessel and the width B of the vessel, the schematic diagram and position information $Y_{head}$ and $Y_{tail}$ of the vessel and the shoreline may be displayed on the display device 105, as shown in FIG. 8. Thus, the pilot can realize the berthing of the vessel at low visibility through the output interface of the display device.

Embodiment 2

This embodiment describes how to obtain optimal position information from multiple groups of data by the following algorithm.

A vector $p_i(x_i,y_i,z_i)$ is used to represent the positioning data, which is subjected to angular and spatial transformation, returned by N systems, where i=1, 2, 3 ... N. The positioning data, which is subjected to angular and spatial transformation, is obtained by the following method: when the relative positions of all the solar blind ultraviolet imaging module and the GPS signal receiving modules and the attitude angle of the vessel are known, the measured position data of different measurement modules are converted into the measured position data of a same measurement module based on a spatial position relationship and through spatially geometric transformation. The specific transformation method is as follows:

(1) a reference point is determined, wherein the reference point may be the position of any one of the solar blind ultraviolet receiving module and the GPS signal receiving modules, or may be another point;

(2) the distance from each other measurement module to the reference point and a direction angle (which is a parameter for a light source reference system and needs to be determined by superposing the attitude angle of the vessel) are measured, so that a corresponding transformation vector is obtained; and (3) the transformation vector is added to the relative position coordinate parameters obtained by each measurement module to obtain the transformed positioning data.

Figure 9:
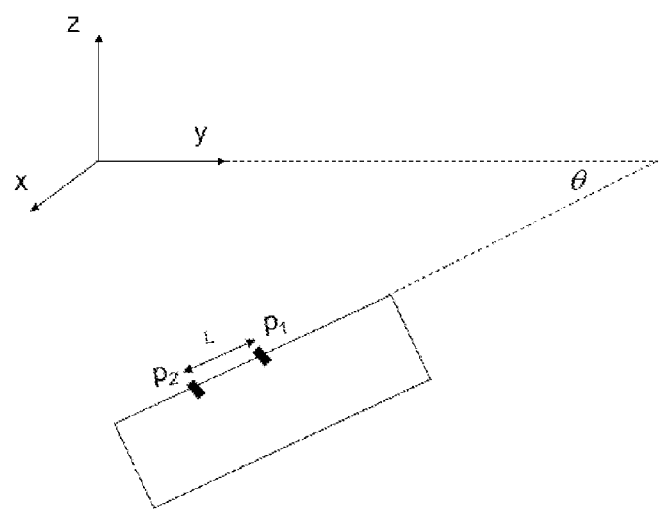
FIG. 9 is a schematic diagram of positions of measurement modules.

As shown in FIG. 9, measurement coordinates of two measurement modules are $p_1(x_1, y_1, z_1)$ and $p_{2'}(x_{2'}, y_{2'}, z_{2'})$, respectively. If it is assumed that $p_1$ is used as a reference, the measured distance between the both is L, an included angle between the connection line of the both and the course is θ, and an angle of pitch is φ (an included angle with the XY plane), a method for) calculating a transformation vector $\vec{A}=(a,b,c)$ is as follows:

$$\begin{cases} a = L \times \cos\varphi \times \cos\theta \\ b = L \times \cos\varphi \times \sin\theta \\ c = L \times \sin\theta \end{cases} \qquad (4)$$

Then, the coordinate of $p_{2'}$ after its transformation to the reference position is $p_2=p_{2'}+\vec{A}$.

The transformed coordinates of other measurement modules may be obtained by the same method.

In this algorithm, a Normalized Correlation Coefficient (NCC) is used to represent the confidence of the positioning data returned by each system, which is expressed as follows:

$$NCC(p_i) = \sum_{\substack{j=1 \\ i \neq j}}^{N} \frac{p_i \cdot p_j}{|p_i||p_j|} = \sum_{\substack{j=1 \\ i \neq j}}^{N} \frac{x_i x_j + y_i y_j + z_i z_j}{\sqrt{x_i^2 + y_i^2 + z_i^2}\sqrt{x_j^2 + y_j^2 + z_j^2}} \quad (5)$$

If a threshold is set to be 80% of the average confidence value of all systems, the threshold G may be expressed as follows:

$$G = \frac{0.8}{N} \sum_{i=1}^{N} NCC(p_i) \quad (6)$$

The positioning data with a lower NCC is filtered according to the threshold G, to obtain a final system confidence weight w, which is expressed as follows:

$$w(p_i) = \begin{cases} NCC(p_i), & NCC(p_i) > G \\ 0, & NCC(p_i) \leq G \end{cases} \quad (7)$$

Thus, the final fitted positioning data is obtained:

$$P_{result} = \frac{\sum_{i=1}^{N} w(p_i) \times p_i}{\sum_{i=1}^{N} w(p_i)} \quad (8)$$

Figure 10:
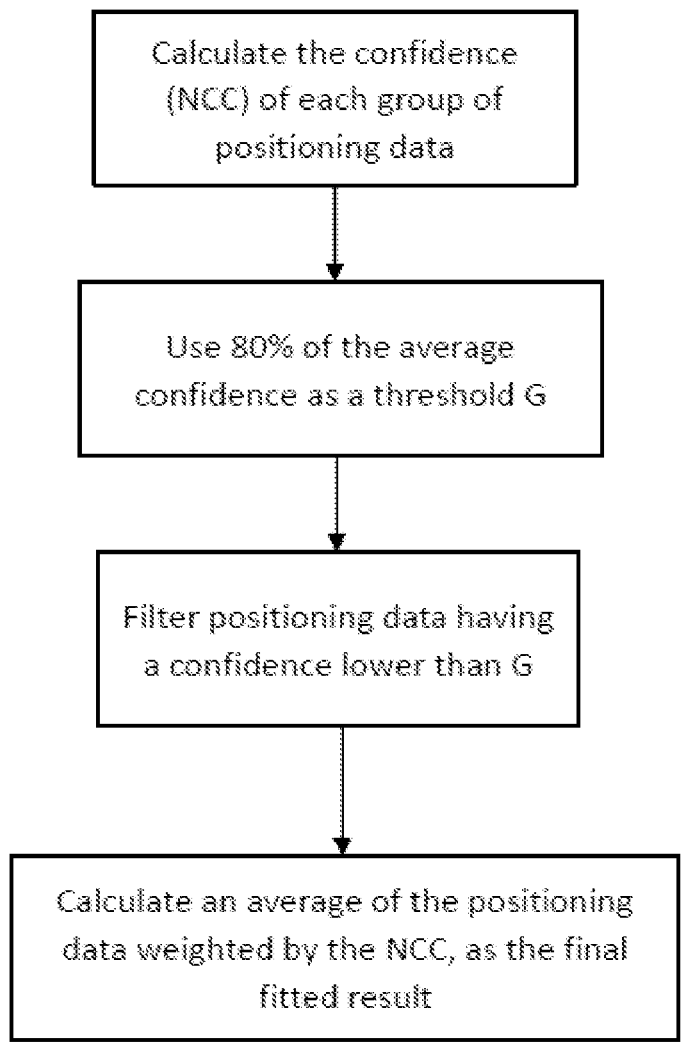
FIG. 10 is a flowchart of a normalized correlation algorithm.

The algorithm flow is shown in FIG. 10.

Embodiment 3

The specific steps of performing ultraviolet camera calibration and solving internal parameters in a system with an enhanced close-distance vessel navigation capability according to the present invention will be described below by way of examples.

There are many methods for calibrating the camera and algorithms for solving the internal parameters. Here, a conventional calibration technology or Zhenyou Zhang's calibration algorithm is preferably selected. In the Zhenyou Zhang's calibration algorithm, a checkerboard-shaped calibration template is used, and connection points of black and white checkers on the calibration template are used as feature points of the calibration target. Calibration targets are placed at different positions, and synchronous acquisition is performed on the camera to obtain internal and external parameters of the camera. This method does not require any expensive instruments, and is excellent in robustness, easy to operate and improved in accuracy in comparison with self-calibration. However, all calibration methods and algorithms for solving internal parameters available to this embodiment shall be included in the present invention.

FIG. 3 shows a calibration flow, where, in a step 1-1-1, an ultraviolet array is arranged; in a step 1-1-2, geometrical information of the ultraviolet array is measured; in a step 1-2, the ultraviolet array is shot by an ultraviolet receiver; and, the software processing includes a step 2-1 of acquiring image plane coordinates of a specified ultraviolet light source and a step 2-2 of solving the internal parameters of the camera by a calibration algorithm. The specific calibration steps are as follows:

Step 1-1-1: An ultraviolet array is arranged. The ultraviolet array is a planar and rectangular grid-shaped ultraviolet array. FIG. 4 shows the ultraviolet array and the shooting position. Geometrical features, such as shape and size, of the ultraviolet array are not limited, and are determined according to the algorithm for solving the internal parameters. The ultraviolet array may be a planar pattern or a stereoscopic pattern, and may be of a rectangular structure, a circular structure or in other geometrical shapes.

Step 1-1-2: Geometrical information of the ultraviolet array is measured, and coordinates $c_w = \{X_1, Y_1, Z_1\}, \{X_2, Y_2, Z_2\} \ldots \{X_{30}, Y_{30}, Z_{30}\}$ of a specific ultraviolet point in a coordinate system o-xyz are measured. The geometrical information of the ultraviolet array refers to the coordinates of the specific ultraviolet point or an angular point in the world coordinate system.

Step 1-2: The ultraviolet array is shot by a solar blind ultraviolet imaging module 103. The selected shooting position A should fulfill the following conditions: at different shooting positions, different orientations of the OA are not parallel, and n groups of images are shot, where n should be greater than 3 in this embodiment.

Step 2-2: The signal processor 104 perform software processing on the shot digital images to obtain image plane coordinate groups $ci_1, ci_2, ci_3 \ldots ci_n$ of the specific ultraviolet point, where there are total n groups.

Step 2-2: $c_w$ and $ci_1, ci_2, ci_3 \ldots ci_n$ are processed by the Zhenyou Zhang's calibration algorithm to obtain related photoelectric internal parameters ($f_x, f_y, c_x, c_y, k_x, k_y$, etc.) of the camera, where $f_x$ and $f_y$ are focal lengths in pixels in the x and y directions, $c_x$ and $c_y$ are reference points in the image plane, and $k_x$ and $k_y$ are radial distortion coefficients in the x and y directions.

The principle of the Zhenyou Zhang's calibration algorithm used herein is as follows:

1) Correspondence Between Angular Points of the Calibration Target and Corresponding Image Points.

If the plane of the calibration target is assumed as $Z_w=0$, then:

$$s \begin{bmatrix} u \\ v \\ 1 \end{bmatrix} = A[r_1 \; r_2 \; r_3 \; T] \begin{bmatrix} X_w \\ Y_w \\ Z_w \\ 1 \end{bmatrix} = A[r_1 \; r_2 \; T] \begin{bmatrix} X_w \\ Y_w \\ 1 \end{bmatrix} = H \begin{bmatrix} X_w \\ Y_w \\ 1 \end{bmatrix} \quad (9)$$

where A is determined by $f_x, f_y, v_0, u_0$ and s, i.e., the internal parameters of the camera, and is related to only the internal structure of the camera; and, H is an external parameter of the camera, and directly reflects the position of the camera in the space. (u,v) represents the pixel coordinates in the image coordinate system, and the world coordinate system is $(X_w, Y_w, Z_w)$. S is an amplification factor, where $s = -f_x \cot \theta$. $f_x = f/\mu_x$ and $f_y = f/\mu_y$, where f is the focal length of the lens. $[X_w, Y_w, Z_w, 1]^T$ represents the world coordinates of any object point in the space, and $[u,v,1]^T$ represents the pixel coordinates of this object point in an imaging point of the camera.

The translation matrix $T=[T_x,T_y,T_z]^T$ is a 4×4 matrix, the rotation matrix R is an 3×3 orthogonal identity matrix, and both the translation matrix T and the rotation matrix R(r1 r2 r3) are external parameters.

If it is assumed that $H=[h_1\ h_2\ h_3]$, then:

$$H=[h_1 h_2 h_3]=\lambda A[r_1 r_2 T] \qquad (10)$$

where $\lambda$ is an arbitrary scaling factor, $r_1$ is orthogonal to $r_2$, and two constraints for A can be obtained:

$$\begin{cases} h_1^T A^{-T} A^{-1} h_2 = 0 \\ h_1^T A^{-T} A^{-1} h_1 = h_2^T A^{-T} A^{-1} h_2 \end{cases} \qquad (11)$$

2) Solution of Parameters $$B = A^{-T}A^{-1} = \begin{bmatrix} B_{11} & B_{12} & B_{13} \\ B_{21} & B_{22} & B_{23} \\ B_{31} & B_{32} & B_{33} \end{bmatrix} = \qquad (12)$$

$$\begin{bmatrix} \frac{1}{f_x^2} & \frac{-s}{f_x^2 f_y} & \frac{v_0 s - u_0 f_y}{f_x^2 f_y} \\ \frac{-s}{f_x^2 f_y} & \frac{s^2}{f_x^2 f_y^2} + \frac{1}{f_y^2} & -\frac{s(v_0 s - u_0 f_y)}{f_x^2 f_y^2} - \frac{v_0}{f_y^2} \\ \frac{v_0 s - u_0 f_y}{f_x^2 f_y} & -\frac{s(v_0 s - u_0 f_y)}{f_x^2 f_y^2} - \frac{v_0}{f_y^2} & \frac{(v_0 s - u_0 f_y)^2}{f_x^2 f_y^2} + \frac{v_0^2}{f_y^2} + 1 \end{bmatrix}$$

It can be seen from the formula that B is a positive definite symmetric matrix, which is defined as follows:

$$b=[B_{11} B_{12} B_{22} B_{13} B_{23} B_{33}]^T \qquad (13)$$

If it is assumed that the $i^{th}$ column of H is $h_i$, then:

$$h_i^T B h_j = v_{ij}^T b \qquad (14)$$

and:

$$v_{ij}=[h_{1i}h_{1j}, h_{1i}h_{2j}+h_{2i}h_{1j}, h_{2i}h_{2j}, h_{3i}h_{1j}+h_{1i}h_{3j}, h_{2i}h_{3j}+h_{3i}h_{2j}, h_{3i}h_{3j}]^T \qquad (15)$$

hence:

$$\begin{bmatrix} v_{12}^T \\ (v_{11}-v_{22})^T \end{bmatrix} b = 0 \qquad (16)$$

That is:

$$Vb=0 \qquad (17)$$

where V is a 2 n×6 matrix; and, when n>2, b has a unique solution, that is, at least three pictures needs to be collected. The internal parameters are decomposed by Cholesky decomposition:

$$\begin{cases} v_0 = -\frac{B_{12}B_{13} - B_{11}B_{23}}{B_{11}B_{22} - B_{12}^2} \\ \lambda = B_{33} - \left[ B_{13}^2 + \frac{v_0(B_{12}B_{13} - B_{11}B_{23})}{B_{11}} \right] \\ f_x = \sqrt{\frac{\lambda}{B_{11}}} \\ f_y = \sqrt{\frac{\lambda B_{11}}{B_{11}B_{22} - B_{12}^2}} \\ s = \frac{-B_{12} f_x^2 f_y}{\lambda} \\ u_0 = \frac{s v_0}{f_y} - \frac{B_{13} f_x^2}{\lambda} \end{cases} \qquad (18)$$

Thus, the external parameters are solved:

$$\begin{cases} r_1 = \lambda A^{-1} h_1 \\ r_2 = \lambda A^{-1} h_2 \\ r_3 = r_1 \times r_2 \\ T = \lambda A^{-1} h_3 \end{cases} \qquad (19)$$

3) Non-linear Optimization

Parameter optimization is performed according to a maximum-likelihood criterion, and the target function is as follows:

$$\sum_{i=1}^{n} \sum_{j=1}^{m} \| m_{ij} - \overline{m}(A, R_i, T_i, M_j) \|^2 \qquad (20)$$

where $\overline{m}$ is a projection of a point $M_j$, and may be solved by an LM optimization algorithm during the optimization.

With the method and device of the present invention, position information of a vessel relative to a berth is determined by a solar blind ultraviolet imaging method; meanwhile, an attitude angle of the vessel relative to the berth is determined by a differential GPS method. Thus, the vessel can be berthed safely when getting close to the shore at low visibility.

The invention claimed is:

1. An auxiliary berthing method for a vessel, comprising:
   providing a solar blind ultraviolet imaging module and a data processing module on a vessel;
   providing a solar blind ultraviolet light source array on a shore;
   transmitting optical signals from the solar blind ultraviolet light source array to the solar blind ultraviolet imaging module;
   mounting two onboard GPS signal receiving modules on the vessel, wherein each of the two onboard GPS signal receiving modules receives a position data of the vessel from a satellite; and
   providing a data processing module, wherein the data processing module processes the position data of the vessel from the solar blind ultraviolet imaging module and from the two onboard GPS signal receiving modules,
   calculates coordinate values of a reference point of the vessel, and
   determines an attitude angle of the vessel relative to a shoreline of the berth according to the position data from the solar blind ultraviolet imaging module and the two onboard GPS signal receiving modules,
wherein the position data include data of a line connecting the two onboard GPS signal receiving modules,
wherein the data processing module further performs normalized correlation on the position data of the vessel, which comprises:
setting a threshold that is an average confidence value of the solar blind ultraviolet imaging module and the two onboard GPS signal receiving modules by global error analysis; filtering the position data using the threshold; obtaining a confidence weight for each of the solar blind ultraviolet imaging module and the at least two GPS signal receiving modules; and obtaining the normalized position data by performing weighted averaging on the position data from each of the solar blind ultraviolet imaging module and the two onboard GPS signal receiving modules using the corresponding confidence weight.

2. The auxiliary berthing method for a vessel according to claim 1, further comprising:
disposing at least one onshore GPS signal receiving module on the shore;
wherein the two onboard GPS signal receiving modules on the vessel and the at least one onshore GPS signal receiving module on the shore work cooperatively to form a GPS differential system, wherein the at least one onshore GPS signal receiving module serves as a master GSP station, the two onboard GPS signal receiving modules serves as slave GPS stations, and an accuracy of measurement of the position and attitude angle data of the vessel by the slave GPS stations is improved by the master GPS station;
wherein upon receiving position data from the related satellite, the master GPS station directly transmits the position data to the data processing module to obtain the position data of the vessel; or, the master GPS station transmits to at least one slave GPS station the position data, and wherein the slave GPS station integrates the received GPS position data, then processes the data and transmits the data to the data processing module.

3. The auxiliary berthing method for a vessel according to claim 2, wherein the master GPS station first transmits the position data to a transmission point in a wireless or wired manner, and then wirelessly transmits the position data from the transmission point to the slave GPS stations at a frequency identical to or different from the previous frequency.

4. The auxiliary berthing method for a vessel according to claim 1, wherein the coordinate values of the positions of the solar blind ultraviolet imaging module and the two onboard GPS signal receiving modules are represented by x, y and z, respectively; a vector $P_i(x_i, y_i, z_i)$ is used to represent the $i^{th}$ group of positioning data among N groups of positioning data, which are subjected to angular and spatial transformation, returned by N groups of detection subsystems, where i=1,2,3 ... N, and N is equal to the number of the GPS signal receiving modules plus 1; the positioning data, which is subjected to angular and spatial transformation, is obtained by the following method: when the relative positions of all the solar blind ultraviolet imaging module and the two onboard GPS signal receiving modules and the attitude angle of the vessel are known, the measured position data of different measurement modules are converted into the measured position data of a same measurement module based on a spatial position relationship and through spatially geometric transformation; and the data processing module performs normalized correlation by the following specific steps:
using a Normalized Correlation Coefficient (NCC) to represent the confidence of the positioning data returned by the N groups of detection subsystems:

$$NCC(p_i) = \sum_{\substack{j=1 \\ i \neq j}}^{N} \frac{p_i \cdot p_j}{|p_i||p_j|} \quad (1)$$

$$= \sum_{\substack{j=1 \\ i \neq j}}^{N} \frac{x_i x_j + y_i y_j + z_i z_j}{\sqrt{x_i^2 + y_i^2 + z_i^2} \sqrt{x_j^2 + y_j^2 + z_j^2}}$$

$$j = 1, 2, 3, \ldots, N;$$

setting a threshold G for the average confidence value of the detection system consisting of all the solar blind ultraviolet imaging module and the GPS signal receiving modules, and filtering the positioning data with a lower NCC according to the threshold G to obtain a final system confidence weight w, which is expressed as follows:

$$w(p_i) = \begin{cases} NCC(p_i), & NCC(p_i) > G \\ 0, & NCC(p_i) \leq G \end{cases} ; \quad (2)$$

then, obtaining the final fitted positioning data on the position of the vessel:

$$p_{result} = \frac{\sum_{i=1}^{N} w(p_i) \times p_i}{\sum_{i=1}^{N} w(p_i)}; \quad (3)$$

and
calculating the fitted attitude angle data of the vessel according to the fitted coordinate values of the N−1 GPS signal receiving modules.

5. The auxiliary berthing method for a vessel according to claim 1, wherein the data processing module integrates the positioning data or the attitude angle data by a data fusion method, respectively; and,
the data fusion method comprises the following specific steps:
(I) when the data to be integrated is positioning data, a vector $P_i(x_i, y_i, z_i)$ is used to represent N groups of positioning data, which are subjected to angular and spatial transformation, returned by N groups of detection subsystems, where i=1 2 3 ... N; the positioning data, which is subjected to angular and spatial transformation, is obtained by the following method: when the relative positions of all the solar blind ultraviolet imaging module and the GPS signal receiving modules and the attitude angle of the vessel are known, the measured position data of different measurement modules are converted into the measured position data of a same measurement module based on a spatial position relationship and through spatially geometric transformation;

a) the confidence of the data returned by each subsystem is judged by using a root-mean-square-error rmse actually calculated by the measured data of each detection subsystem, where the formula for calculating the root-mean-square-error of the measured data of each subsystem is as follows:

$$rmse = \sqrt{\sum_{i=1}^{n}(x_i - x_f)^2/(n+1)} \quad (4)$$

where rmse represents the root-mean-square-error, $x_i$ represents the measured data of each measurement subsystem on the X-axis coordinate at a moment i, $x_f$ represents the filtered value of the data $x_i$ at the moment i, n represents the total number of the measured data, i.e., the number of the subsystems, and the filtered value at the moment i is obtained by Kalman filtering;

b) determination of a weight: weight assignment is performed by curve fitting on a segment basis:

$$\omega = \begin{cases} 0, & |e| \geq b \\ f(|e|), & b \geq |e| \geq a \\ 1, & |e| \leq a \end{cases} \quad (5)$$

where ω is the weight, the parameter b is the minimum limit for judging outliers, and the parameter a is a boundary value between a valid numerical value and an available numerical value; if the error is greater than b, the error is considered as an outlier and the corresponding weight is 0; if the error is less than a, the error is considered as a valid value and the corresponding weight is 1; the weight of an intermediate available value is given according to a curve y=f(x), and f(x) must fulfill the condition that, within an interval (a,b), f(x) decreases rapidly with the increase of the error; the f(x) is expressed as follows:

$$f(x) = \frac{1}{\sqrt{2\pi}\sigma}\exp\left(-\frac{(x-\mu)^2}{2\sigma^2}\right) \quad (6)$$

where μ and σ are a mean and a square for the normal distribution, respectively, since a normal curve exhibits the characteristics of a decreasing function within a region of x>μ, then μ=0; actually, a half-normal curve is applied; and the f(x) is further expressed as follows:

$$f(x) = \frac{1}{\sqrt{2\pi}\sigma}\exp\left(-\frac{x^2}{2\sigma^2}\right) \quad (7)$$

the value of σ is given according to the 3σ rule, and can be obtained by a normal curve fitting weight assignment method through the following formula:

$$a_{ki} = \frac{f(rmse_{ki})}{\sum_{i=1}^{n} f(rmse_{ki})} \quad (8)$$

furthermore, $$\sum_{i=1}^{N} a_{ki} = 1,$$

where $rmse_{ki}$ represents the root-mean-square-error of the $i^{th}$ system at a moment k, and $\alpha_{ki}$ represents the weight of the $i^{th}$ system at the moment k;

c) the final result of data fusion is as follows:

$$\hat{X}_{ki} = \sum_{i=1}^{N} a_{ki} X_{ki} \quad (9)$$

where $\hat{X}_{ki}$ is the fused value at the moment k, and $x_{ki}$ represents the measured data obtained by each subsystem at the moment k; and d) by the same method as in the steps a) to c), a final result of data fusion of the Y-axis coordinate value y and the Z-axis coordinate value z is calculated; and (II) when the data to be integrated is the attitude angle data, a vector ($\alpha_i$, $\beta_i$, $\gamma_i$) is used to represent N groups of attitude angle data returned by the N measurement subsystems, where i=1,2,3 . . . N; and, by the same method as in the step (I), the integrated attitude angle data is calculated.

6. The auxiliary berthing method for a vessel according to claim 1, characterized in that the data processing module integrates the positioning data or the attitude angle data by a data fusion method, respectively; and, the data fusion method comprises the following specific steps:

(I) when the data to be integrated is the positioning data, a vector $P_i(x_i, y_i, z_i)$ is used to represent N groups of positioning data, which are subjected to angular and spatial transformation, returned by N groups of detection subsystems, where i=1, 2, 3 . . . N; the positioning data, which is subjected to angular and spatial transformation, is obtained by the following method: when the relative positions of all the solar blind ultraviolet imaging module and the GPS signal receiving modules and the attitude angle of the vessel are known, the measured position data of different measurement modules are converted into the measured position data of a same measurement module based on a spatial position relationship and through a spatially geometric transformation;

a) a standard deviation of each coordinate sequence in the position data is calculated: the standard deviation of each coordinate sequence in the N groups of positioning data returned by the N groups of detection subsystems is calculated as the basis for judging outliers in each coordinate sequence in the N groups of data, where the standard deviation of each coordinate sequence is as follows:

$$\sigma_{index} = \sqrt{(X_{index} - \overline{X}_{index})^2/N} \quad (10)$$

where, if index∈(x,y,z), $\sigma_{index}$ presents the standard deviation of each coordinate sequence in the N groups of data, $X_{index}$ represents the N groups of measured data, each of which contains a coordinate value (x,y,z), and $\overline{X}_{index}$ represents the average value of the N groups of data, i.e., a one-dimensional vector formed by the average value of each coordinate sequence;

b) outliers in each coordinate sequence are obtained according to the calculated standard deviation, wherein the outliers can be judged by the following formula:

$$\text{outliters} = |X_{index} - \bar{X}_{index}| > C * \sigma_{index} \quad (11)$$

where outliers represent the obtained outliers; once a coordinate value in a group of coordinate data consisting of x,y,z is judged as an outlier in its sequence, this group of coordinate values is judged as an outliner in the N groups of coordinate data; C is a constant coefficient determined according to experimental experiences and requirements; and the constant can be determined by: judging a fluctuation range of test values through lots of tests, selecting a symmetric range by using a mean of the test values as a center with lots of unreasonable points going beyond this range, and using half of the length of this range as C;

c) the outliers are removed from the N groups of original measured data to obtain a new positioning data sequence X' having a dimensionality of N', and performing equally-weighted average data fusion on X' to obtain final fused data, as follows:

$$\hat{X}' = \frac{1}{N'} \sum_{i=1}^{N} X' \quad (12)$$

where $\hat{X}'$ is the final positioning data after data fusion; and d) by the same method as in the steps a) to c), a final result of data fusion of the Y-axis coordinate value y and the Z-axis coordinate value z is calculated; and (II) when the data to be integrated is the attitude angle data, a vector $q_i(\alpha_i, \beta_i, \gamma_i)$ is used to represent N groups of attitude angle data returned by the N groups of detection subsystems, where i=1,2,3 ... N; and, by the same method as in the step (I), the integrated attitude angle data is calculated.

7. The auxiliary berthing method for a vessel according to claim 1, further comprising calibrating the solar blind ultraviolet imaging module to determine measurement-related photoelectric parameters of the solar blind ultraviolet imaging module.

8. The auxiliary berthing method for a vessel according to claim 7, wherein the measurement-related photoelectric parameters of the solar blind ultraviolet imaging module include focal lengths $f_x$ and $f_y$ in pixels in the x-axis direction and the y-axis direction, positions $c_x$ and $c_y$ of reference points in an image plane, and radial distortion coefficients $k_x$ and $k_y$ in the x-axis direction and the y-axis direction.

9. The auxiliary berthing method for a vessel according to claim 1, wherein a power control system of the vessel receives a berthing distance signal of the solar blind ultraviolet light source array transmitted by the data processing module, and adjusts the attitude of the vessel for berthing.

10. An auxiliary berthing system for a vessel, comprising:
a solar blind ultraviolet imaging module disposed on a vessel and configured to measure, according to received optical signals transmitted by a solar blind ultraviolet light source array disposed shore, information about a position relationship between the vessel and a berth;
a data processing module, electrically connected to the solar blind ultraviolet imaging module and configured to process the received data of the solar blind ultraviolet imaging module to obtain coordinates of the vessel;
at least two onboard GPS signal receiving modules mounted on the vessel, and each onboard GPS signal receiving module comprises a receiver for receiving a position signal from a satellite and a transmitter for transmitting the received satellite signal to the data processing module
wherein the data processing module is electrically connected to the onboard GPS signal receiving modules and processes the position data received from the satellite by the onboard GPS signal receiving modules and determines an attitude angle of the vessel;
an onshore GPS signal receiving module disposed on shore,
wherein the onboard GPS signal receiving modules and the onshore GPS signal receiving module work cooperatively to form a GPS differential system, wherein the onshore GPS signal receiving module serves a master GSP station, and the onboard GPS signal receiving modules serve as a slave GPS station, and the slave GPS station receives from the satellite its own position data and receives from the master GPS station the position data of the master GPS station, and processes the data or transmits the data to the data processing module for processing to obtain data representing the position and attitude angle of the vessel,
wherein the data processing module integrates coordinate values obtained by the solar blind ultraviolet imaging module and the GPS signal receiving modules by a normalized correlation algorithm; x, y and z represent three-axis coordinates of the solar blind ultraviolet imaging module and the two onboard GPS signal receiving modules,
respectively; a vector $P_i(x_i, y_i, z_i)$ is used to represent the $i^{th}$ group of positioning data among N groups of positioning data, which are subjected to angular and spatial transformation, returned by N groups of detection subsystems, where i=1 2 3 ... N, and N is equal to the number of the GPS signal receiving modules plus 1; the positioning data, which is subjected to angular and spatial transformation, is obtained by the following method:
when the relative positions of all the solar blind ultraviolet imaging module and the GPS signal receiving modules and the attitude angle of the vessel are known, the measured position data of different measurement modules are converted into the measured position data of a same measurement module based on a spatial position relationship and through spatially geometric transformation; and the data processing module performs normalized correlation by the following specific steps:
using a Normalized Correlation Coefficient (NCC) to represent the confidence of the positioning data returned by the N groups of detection subsystems:

$$NCC(p_i) = \sum_{\substack{j=1 \\ i \neq j}}^{N} \frac{p_i \cdot p_j}{|p_i||p_j|} \quad (13)$$

$$= \sum_{\substack{j=1 \\ i \neq j}}^{N} \frac{x_i x_j + y_i y_j + z_i z_j}{\sqrt{x_i^2 + y_i^2 + z_i^2} \sqrt{x_j^2 + y_j^2 + z_j^2}}$$

$$j = 1, 2, 3, \ldots, N;$$

setting a threshold G for the average confidence value of the detection system consisting of all the solar blind ultraviolet imaging module and the GPS signal receiving modules, and filtering the positioning data with a lower NCC according to the threshold G to obtain a final system confidence weight w, which is expressed as follows:

$$w(p_i) = \begin{cases} NCC(p_i), NCC(p_i) > G \\ 0, NCC(p_i) \leq G \end{cases};\quad (14)$$

then, obtaining the final fitted positioning data on the position of the vessel:

$$p_{result} = \frac{\sum_{i=1}^{N} w(p_i) \times p_i}{\sum_{i=1}^{N} w(p_i)};\quad (15)$$

and calculating the fitted attitude angle data of the vessel according to the fitted coordinate values of the N−1 GPS signal receiving modules.

11. The auxiliary berthing system for a vessel according to 10, wherein, by using a data fusion method, the data processing module integrates the coordinate data received by the GPS signal receiving modules, or integrates the coordinate data measured by the GPS signal receiving modules with the coordinate data measured by the solar blind ultraviolet imaging module, or integrates the attitude angle received by the GPS signal receiving modules; and, the data fusion method comprises the following specific steps:

(I) when the data to be integrated is the positioning data, a vector $P_i(x_i, y_i, z_i)$ is used to represent N groups of positioning data, which are subjected to angular and spatial transformation, returned by N groups of detection subsystems, where i=1 2 3 . . . N; the positioning data, which is subjected to angular and spatial transformation, is obtained by the following method: when the relative positions of all the solar blind ultraviolet imaging module and the GPS signal receiving modules and the attitude angle of the vessel are known, the measured position data of different measurement modules are converted into the measured position data of a same measurement module based on a spatial position relationship and through spatially geometric transformation;

a) the confidence of the data returned by each subsystem is judged by using a root-mean-square-error rmse actually calculated by the measured data of each detection subsystem, where the formula for calculating the root-mean-square-error of the measured data of each subsystem is as follows:

$$rmse = \sqrt{\sum_{i=1}^{n}(x_i - x_f)^2/(n+1)} \quad (16)$$

where rmse represents the root-mean-square-error, $x_i$ represents the measured data of each measurement subsystem on the X-axis coordinate at a moment i, $x_f$ represents the filtered value of the data $x_i$ at the moment i, n represents the total number of the measured data, i.e., the number of the subsystems, and the filtered value at the moment i is obtained by Kalman filtering;

b) determination of a weight: weight assignment is performed by curve fitting on a segment basis:

$$\omega = \begin{cases} 0, |e| \geq b \\ f(|e|), b \geq |e| \geq a \\ 1, |e| \leq a \end{cases} \quad (17)$$

where ω is the weight, the parameter b is the minimum limit for judging outliers, and the parameter a is a boundary value between a valid numerical value and an available numerical value; if the error is greater than b, the error is considered as an outlier and the corresponding weight is 0; if the error is less than a, the error is considered as a valid value and the corresponding weight is 1; the weight of an intermediate available value is given according to a curve y=f(x), and f(x) must fulfill the condition that, within an interval (a,b), f(x) decreases rapidly with the increase of the error; the f(x) is expressed as follows:

$$f(x) = \frac{1}{\sqrt{2\pi}\,\sigma}\exp\left(-\frac{(x-\mu)^2}{2\sigma^2}\right) \quad (18)$$

where μ and σ are a mean and a square for the normal distribution, respectively, since a normal curve exhibits the characteristics of a decreasing function within a region of x>μ, then μ=0; actually, a half-normal curve is applied; and the f(x) is further expressed as follows:

$$f(x) = \frac{1}{\sqrt{2\pi}\,\sigma}\exp\left(-\frac{x^2}{2\sigma^2}\right) \quad (19)$$

the value of σ is given according to the 3σ rule, and can be obtained by a normal curve fitting weight assignment method through the following formula:

$$a_{ki} = \frac{f(rmse_{ki})}{\sum_{i=1}^{n} f(rmse_{ki})} \quad (20)$$

furthermore, $$\sum_{i=1}^{N} a_{ki} = 1,$$

where $rmse_{ki}$ represents the root-mean-square-error of the $i^{th}$ system at a moment k, and $\alpha_{ki}$ represents the weight of the $i^{th}$ system at the moment k;

c) the final result of data fusion is as follows:

$$\hat{X}_{ki} = \sum_{i=1}^{N} a_{ki} X_{ki} \quad (21)$$

where $\hat{X}_{ki}$ is the fused value at the moment k, and $x_{ki}$ represents the measured data obtained by each subsystem at the moment k;

d) by the same method as in the steps a) to c), a final result of data fusion of the Y-axis coordinate value y and the Z-axis coordinate value z is calculated; and (II) when the data to be integrated is the attitude angle data, a vector $1_i(\alpha_i, \beta_i, \gamma_i)$ is used to represent N groups of attitude angle data returned by the N groups of detection subsystems, where i=1,2,3 . . . N; and, by the same method as in the step (I), the integrated attitude angle data is calculated.

12. The auxiliary berthing system for a vessel according to claim 10, wherein a power control system of the vessel receives a berthing distance signal of the solar blind ultraviolet light source array transmitted by the data processing module, and thereby adjusts the attitude of the vessel for berthing.

* * * * *